United States Patent
Lobez Comeras (10) Patent No.: US 9,442,695 B2
(45) Date of Patent: Sep. 13, 2016

(54) RANDOM BIT GENERATOR BASED ON NANOMATERIALS

(71) Applicant: International Business Machines Corporation, Armonk, NY (US)

(72) Inventor: Jose Miguel Lobez Comeras, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 76 days.

(21) Appl. No.: 14/602,797

(22) Filed: Jan. 22, 2015

(65) Prior Publication Data

US 2015/0317494 A1 Nov. 5, 2015

Related U.S. Application Data

(60) Provisional application No. 61/987,806, filed on May 2, 2014.

(51) Int. Cl.
*G06F 11/30* (2006.01)
*G06F 7/58* (2006.01)
*H04L 9/32* (2006.01)
(Continued)

(52) U.S. Cl.
CPC ............... *G06F 7/58* (2013.01); *G06F 7/588* (2013.01); *G06F 21/62* (2013.01); *G06F 21/64* (2013.01); *H04L 9/32* (2013.01); *H04L 9/3247* (2013.01)

(58) Field of Classification Search
CPC .......... G06F 7/58; G06F 21/62; G06F 21/64; G06F 7/588; H04L 9/32; H04L 9/3247
See application file for complete search history.

(56) References Cited

U.S. PATENT DOCUMENTS

| | | |
|---|---|---|
| 5,301,143 A | 4/1994 | Ohri et al. |
| 6,900,479 B2 | 5/2005 | DeHon et al. |
| 7,680,306 B2 | 3/2010 | Boutant et al. |

(Continued)

FOREIGN PATENT DOCUMENTS

WO 0152207 A1 7/2001

OTHER PUBLICATIONS

Ali Afzali-Ardakani, et al.; "Selective Placement of Carbon Nanotubes Via Coulombic Attraction of Oppositely Charged Carbon Nanotubes and Self-Assembled Monolayers"; U.S. Appl. No. 15/001,774, filed Jan. 20, 2016.

(Continued)

*Primary Examiner* — Krisna Lim
(74) *Attorney, Agent, or Firm* — Cantor Colburn LLP; Vazken Alexanian (57) ABSTRACT

The present invention relates to a method of generating an array of random bits. The method generates unique arrays of random bits using carbon nanotube field effect transistor fabrication technology and can be used for security applications. The method includes: modifying a substrate to form a modified surface having a pattern selected from a group including: trenches, rigs, and a combination thereof; depositing a compound on the trenches and/or the rigs; and applying a dispersion of carbon nanomaterials onto the modified surface to form an array of random bits. The first system includes setting an array of random bits based on carbon nanomaterials as a digital signature by measuring electric charge flowing through each individual bit. The second system includes protecting an array of random bits against iterative unauthorized accessing mechanisms.

20 Claims, 5 Drawing Sheets

(51) Int. Cl.
*G06F 21/62* (2013.01)
*G06F 21/64* (2013.01)

(56) References Cited

U.S. PATENT DOCUMENTS

| | | |
|---|---|---|
| 7,692,952 B2 | 4/2010 | DeHon |
| 7,891,567 B2 | 2/2011 | Burden et al. |
| 8,028,924 B2 | 10/2011 | Anderson et al. |
| 2009/0301349 A1* | 12/2009 | Afzali-Ardakani .... B82Y 30/00 106/287.25 |
| 2009/0320911 A1 | 12/2009 | Ruoff |
| 2010/0131578 A1* | 5/2010 | Fukushima ............. G06F 7/588 708/250 |
| 2013/0082233 A1 | 4/2013 | Afzali-Ardakani et al. |
| 2013/0124783 A1* | 5/2013 | Yoon ................... G06F 12/0246 711/103 |

OTHER PUBLICATIONS

Ali Afzali-Ardakani, et al.; "Selective Placement of Carbon Nanotubes Via Coulombic Attraction of Oppositely Charged Carbon Nanotubes and Self-Assembled Monolayers"; U.S. Appl. No. 15/001,802, filed Jan. 20, 2016.

List of IBM Patents or Patent Applications Treated As Related—Date Filed: Feb. 10, 2016; 1 page.

Pengfei Wu, et al., "Backward Scattering Effect of Aligned Carbon Nanotube Arrays," Proceedings of SPIE, vol. 7223, Feb. 2009, 72231A, pp. 1-8.

List of IBM Patents or Patent Applications Treated as Related; Jan. 22, 2015, pp. 1-2.

* cited by examiner

FIG. 5

RANDOM BIT GENERATOR BASED ON NANOMATERIALS

DOMESTIC PRIORITY

This application claims priority to United States Provisional Application No. 61/987,806, entitled "RANDOM BIT GENERATOR BASED ON NANOMATERIALS," filed May 2, 2014, which is incorporated herein by reference in its entirety.

BACKGROUND

The present invention relates to a random bit generator, and more specifically, to a fabrication method for physical deposition of carbon nanomaterials into random positions to generate unique arrays of random bits.

An array of bits, containing "1"s and "0"s, can typically be used for in security applications. Security applications include physical labels, key generation, item or IDs, and artificial fingerprints. The array of bits is stored as a passcode requiring the user to input the passcode to gain access.

An array of bits can be randomly generated or created by an operator. U.S. Pat. No. 6,900,479 and U.S. Pat. No. 5,301,143 propose methods of creating arrays containing "1" and "0" arrangements being used for digital memory and identification purposes. These arrays are created by an operator which limits the uniqueness of each array created.

Existing technology disclosed by the prior art does not use deposition by directed self-assembly (WO 0152207; and U.S. Pat. Nos. 7,692,952 B2; and 8,028,924). Directed self-assembly allows for smaller pitch features. Smaller pitch features permit greater uniqueness and higher density in the array.

The signal produced by the array can be read in multiple ways. U.S. Pat. No. 7,680,306 describes using digital signatures from fibrous media for security purposes. This signal can only be read optically. Optical signals are less complex then electrical signals. Electrical signals can be more complex and have different layers of security.

Magnetic reading can be utilized to read the signal. Disclosed in U.S. Pat. No. 7,891,567 magnetic particles distributed in a porous network can be used as a digital fingerprint. Magnetic reading is limited because the array of randomly generated bits requires swiping or accessing the label physically and it cannot be read remotely or electronically.

Current technology for array duplication, not based on using carbon nanotube field effect transistors (CNTFET) require a higher voltage to operate than CNTFET. By using lower voltages, only CNTFET arrays can be read. Additionally, methods for arrays that are not randomly generated and must be decided by the operator typically have larger pitch features, making them less unique.

The present invention proposes solutions to the limitations that are inherent in the prior art.

SUMMARY

Accordingly, one aspect of the present invention provides a method of generating an array of random bits, including the steps of: modifying a substrate to form a modified surface having a pattern selected from a group including: trenches, rigs, and a combination thereof; depositing a compound on the trenches and the rigs; and applying a dispersion of carbon nanomaterials onto the modified surface to form an array of random bits.

Another aspect of the present invention provides a security system for digital signature including an array of random bits based on carbon nanomaterials, the security system including: a memory; a processor communicatively coupled to the memory; and a digital signature module communicatively coupled to the memory and the processor, wherein the processor is configured to perform the steps of a method including: providing an array of random bits based on carbon nanomaterials; depositing at least two metal electrodes into contact with the array of random bits based on carbon nanomaterials; measuring electric charge flow through each individual bit in the array of random bits based on carbon nanomaterials; mapping a distribution of conductivity based on electric charge flow; and forming a digital signature based on the distribution map of conductivity based on electric charge flow.

Another aspect of the present invention provides a security system for protecting an array of random bits, the security system including: a memory; a processor communicatively coupled to the memory; and a protection module communicatively coupled to the memory and the processor, wherein the protection module is configured to carry out the steps of a method including: installing an array of random bits as a passcode; detecting an unauthorized passcode if an unauthorized passcode is presented; and preventing access in response to an unauthorized passcode.

DETAILED DESCRIPTION

A unique Array of Randomly Generated Bits (ARGB) can be obtained with carbon nanotube field effect transistor (CNTFET) fabrication technology. This technology is based on the generation of a regular array of uniformly distributed trenches or rigs that can be transformed into CNTFETs using appropriate fabrication steps.

The fabrication of CNFETs occurs on a substrate, a pre-patterned surface with a vast number of elevated rigs, embedded trenches, or a combination of trenches and rigs. The trenches and rigs have a geometric shape and are a size such that a carbon nanomaterial can be placed. In an embodiment of the present invention the trenches and rigs are uniformly distributed on the substrate. The trenches and rigs are separated by a separation pitch.

In an embodiment of the present invention a large scale wafer serves as the substrate for the devices.

Embodiments of the present invention will now be described below with reference to the accompanying drawings. In the following description, elements that are identical are referenced by the same reference numbers in all the drawings unless noted otherwise. The configurations explained here are provided as preferred embodiments, and it should be understood that the technical scope of the present invention is not intended to be limited to these embodiments.

Figure 1:
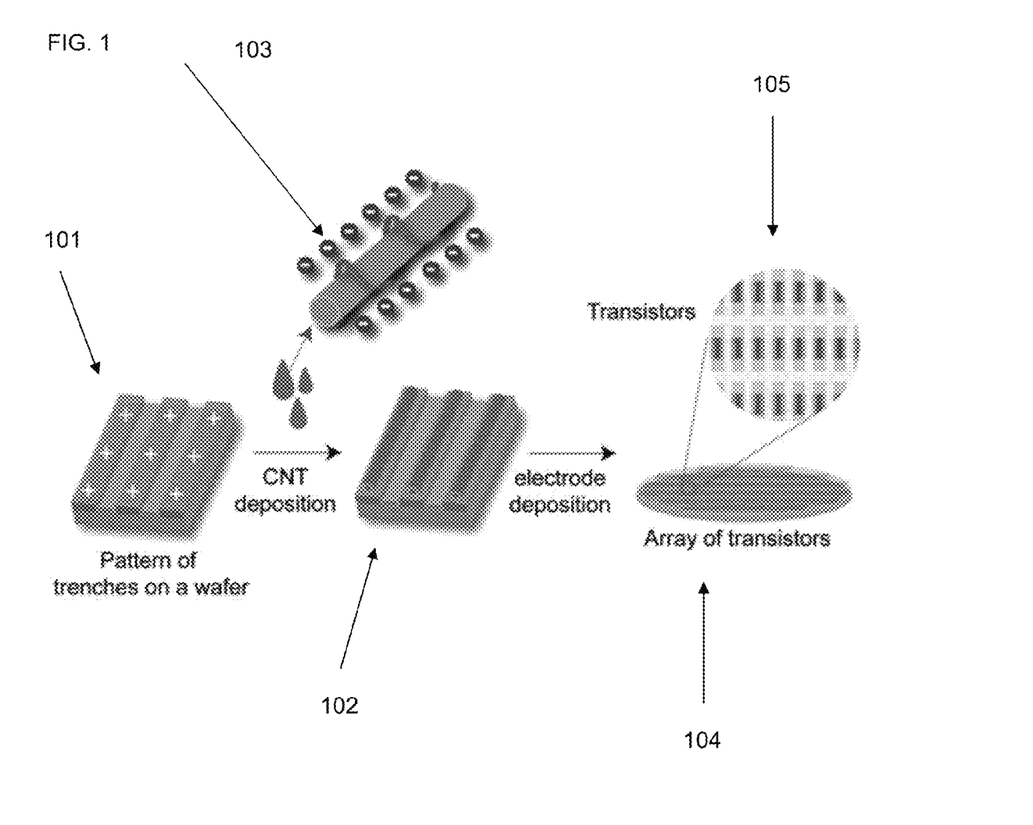
FIG. 1 illustrates a schematic view of the fabrication process of vast arrays of transistors on a wafer.

FIG. 1 depicts a schematic view of the fabrication process of vast arrays of transistors on a wafer according to an embodiment of the present invention. Substrate 101 is a wafer patterned with a plurality of rigs bearing charges. In the present invention the trenches and rigs are electrically charged.

A compound is deposited onto the rigs to electrically charge the rigs. The compound only interacts with the rigs. Since the compound is not deposited in the separation pitches, the carbon nanomaterials do not bind to the separation pitches. The compound is an electrically charged monolayer. In another embodiment of the present invention, the compound can be tailored to interact only with the trenches.

In an embodiment of the present invention the wafer is coated with positive charges. The coating creates trenches or rigs bearing positive electric charges.

In an embodiment, the compound contains hydroxamic acids that only bind to certain metal oxides. The substrate is made of silicon dioxide. The carbon nanomaterials are modified to contain hafnium oxide. Since hafnium oxide is more basic than silicon dioxide, only the hafnium oxide will interact with the hydroxamic acids.

In the present invention the substrate wafer can be modified so that the wafer surface has a pattern of trenches and rigs with an even separation pitch in the order of magnitude of hundreds of nanometers to several microns. In an embodiment of the present invention a separation pitch of 200 nanometers can be applied. In another embodiment of the present invention a separation pitch of 15 nanometers can be applied. A smaller pitch size allows for a higher density array. Experimentally, in an embodiment of the present invention, a high density array is approximately $10^{19}$ bits per square cm.

Obtaining a smaller separation pitch can increase uniqueness in the ARGB. In an embodiment of the present invention, trenches rather than rigs are used because if the rig separation pitch is too small, for example 15 nanometers, a cross over can occur where a deposited carbon nanomaterial can land on more than one rig.

Next, a dispersion of carbon nanomaterials 103 is prepared. Every carbon nanomaterial in the dispersion is charged. The carbon nanomaterials are charged by a polymeric dispersant or by a low-molecular weight capable of bringing the carbon nanomaterials into solution.

When applying electrostatic assembly, a conjugated polymer or an organic molecule can be used to functionalize the surface of the carbon nanomaterials. Once functionalized, the carbon nanomaterials are attracted to the compound, which was deposited onto the trenches or the rigs. In an embodiment of the present invention the dispersant is negatively charged polythiophene for carbon nanomaterial placement on positively charged trenches and rigs. The carbon nanomaterials can be charged by covalently modifying the surface of the carbon nanomaterials to display negative charges. In another embodiment of the present invention the carbon nanomaterials are given positive charges.

In an embodiment of the present invention, non-electrostatic assembly of the carbon nanomaterials is applied. Non-electrostatic assembly can be based on acid and base reactions.

According to an embodiment of the present solution, the dispersion is prepared by first dissolving a dispersant or reagent a solvent. Then carbon nanomaterials are added to the dispersion and the excess dispersant or reagent is removed. In an embodiment of the present invention the excess dispersant can be removed by filtering out the carbon nanomaterials from the dispersion though a filter, washing with excess solvent, and then dispersing the carbon nanomaterials by sonication back into the dispersion.

In another embodiment of the present invention excess dispersant can be removed by centrifugation of the carbon nanomaterials to the bottom of a vial removing the supernatant, and then dispersing the carbon nanomaterials by sonication back into the dispersion. In yet another embodiment, dialysis removes the excess dispersant.

According to an embodiment, an additional step of deprotonation is included. Deprotonation is done by adding base.

In the present invention an infinite number of carbon nanomaterials can be utilized in creating the ARGB. Experimentally the yield for disposition of a carbon nanomaterial is less than 100% and approximately 50%. Electrostatic repulsion generally prevents more than one carbon nanomaterial from occupying each trench or rig. Additionally, in an embodiment of the present invention a pitch separation no less then 15 nanometers is used because a carbon nanomaterial in one trench or rig can repel another carbon nanomaterial from landing in an adjacent trench or rig.

In FIG. 1, the carbon nanomaterials are selectively deposited onto substrate 101. The carbon nanomaterials produce an ARGB on the surface of the wafer 102. The carbon nanomaterials are deposited onto the trenches and the rigs of Substrate 101 by solution. Carbon nanomaterials only bind to the trenches and the rigs of substrate 101. A compound is used to modify the surface of the carbon nanomaterials and substrate 101.

The present invention uses self-assembly to increase uniqueness. In an embodiment of the present invention drop casting is used to apply the dispersion containing the carbon nanomaterials onto the substrate.

In other embodiments of the present invention spin coating, spraying, or dip-coating are used to apply the dispersion containing the carbon nanomaterials to the substrate.

Finally, metallization steps are taken to complete the transistor fabrication. Electrodes are deposited onto the CNTFET, in the trenches and the rigs, in contact with the carbon nanomaterials, to read the signal and create a map based on the signal produced by the array of transistors 104 and 105. In the present invention at least two electrodes are utilized.

In an embodiment of the present invention, a voltage is applied through the electrodes to each individual bit in the array. For a trench or rig which a carbon nanomaterial has been deposited current will flow, producing a signal of "1". If there is no current flow, then no carbon nanomaterial was deposited, producing a "0". Once voltage is applied through each individual bit the two-dimensional map of "1"s and "0" represents the signal produced by the array.

Figure 2:
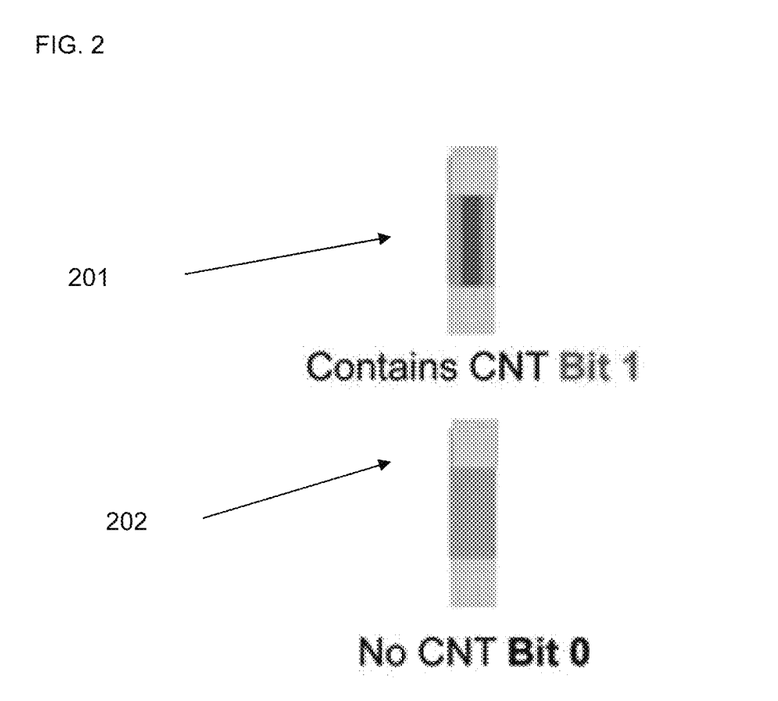
FIG. 2 illustrates types of transistors/bits obtained, either transistors/bits containing a nanotube or not.

FIG. 2 illustrates types of transistors/bits obtained. In the present invention, the substrate will have an array of devices/bits that can contain a carbon nanomaterial, Bit 1 201, or not, Bit 0 202. The electric and optical properties of these bits will be completely different depending upon if they are Bit 1 201 or Bit 0 202. For example, current will flow through Bit 1 201, but not Bit 0 202.

Figure 3:
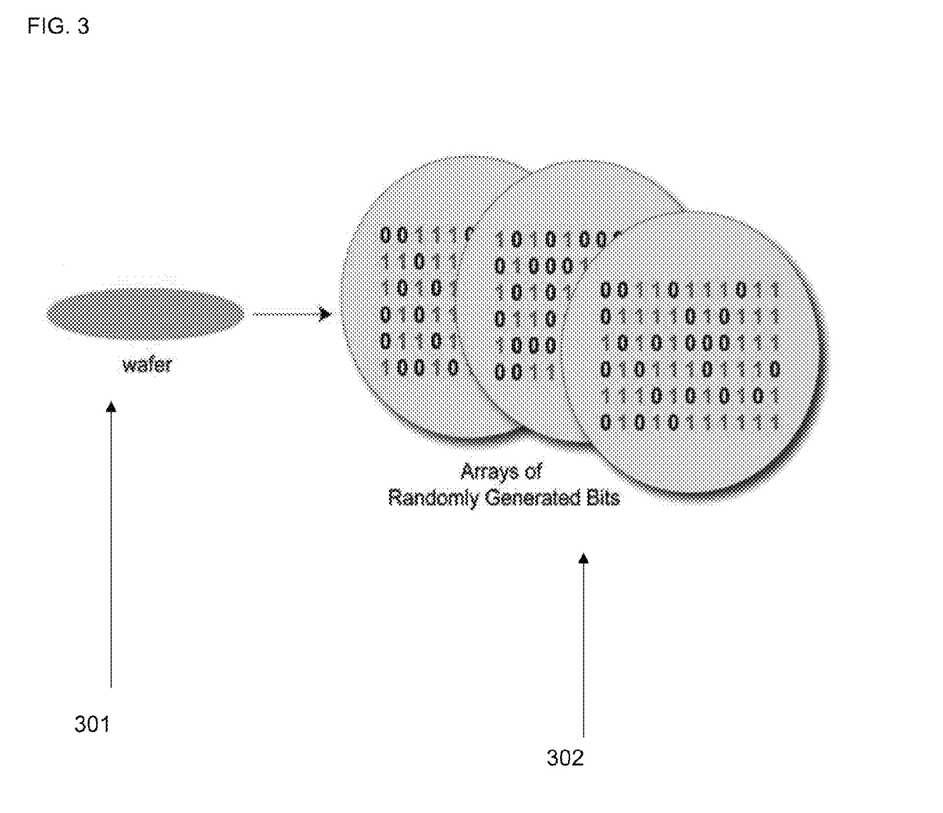
FIG. 3 illustrates examples of arrays of randomly generated bits.

FIG. 3 illustrates examples of ARGB. For an embodiment of the present invention, a wafer 301 is the substrate. Upon the wafer 301 an ARGB is formed. The distribution and population of the bits are random, and each array 302 will be unique since a vast number of trenches, and therefore bits can be placed in every substrate.

The two-dimensional map of "1"s and "0" represents the signal produced by the ARGB. Each ARGB fabricated according to the method of the present invention will have a unique distribution of "1" bits and "0" bits. In an embodiment of the present invention, the map produced can be read electronically and used as a digital signature. Storing the map as a digital signature enables the array to be employed as a physical key for advanced security applications. In an embodiment of the present invention, the map produced can be read optically. Carbon nanomaterials are irradiated with light of a predetermined specific wavelength and emit light which is read by a camera. Recognition of the unique two-dimensional map can grant access to a physically restricted area.

In an embodiment of the present invention optical properties can include the Raman signature of individual bits or fluorescence of the ARGB.

In an embodiment, the map showing the distribution of current flow produced by the ARGB can be read remotely. The ARGB can be networked and transmitted wireles sly.

In an embodiment of the present invention the signal can be measured by a group of devices connected together in a tree structure, each bit is connected in series. This produces a more complex signal. The route that the signal travels, defined by the ARGB, is recorded and then used as a digital signature.

Figure 4:
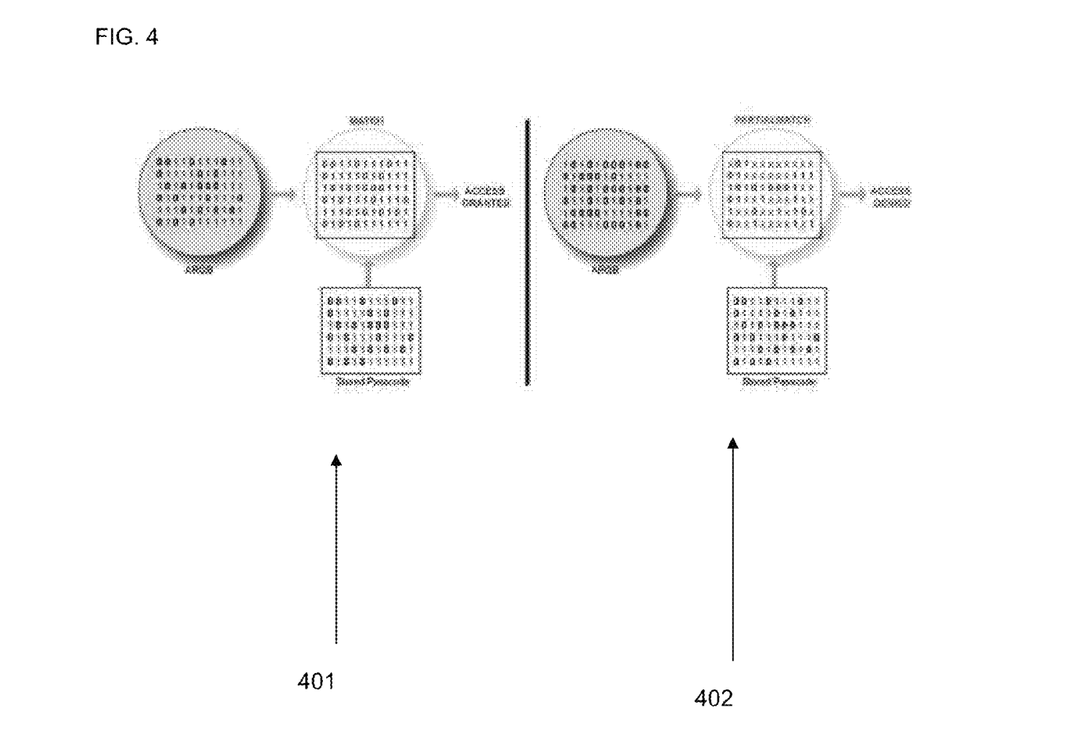
FIG. 4 illustrates a normal mode of operation of a security system based on an array of randomly generated bits.

FIG. 4 illustrates a normal mode of operation of a security system based on an ARGB. The unique two-dimensional map or digital fingerprint of "1" bits and "0" bits from fabrication of each individual ARGB can be stored in a secure system as a passcode. A comparison and match of the fingerprint of "1" bits and "0" bits in the physical ARGB to the passcode can be used to grant access to a restricted area. A complete match of the ARGB stored as the passcode will grant the user access to a restricted area 401. However, a non-match or partial match will deny access 402.

In an embodiment of the present invention, a two-dimensional map is generated and every digit, corresponding to each bit, can be either a "1" or "0". Experimentally the yield for disposition of a carbon nanomaterial in a trench or rig is approximately 50%. Under these conditions, the number of possible combinations for any one given ARGB is given by the formula $2^n$, where n is the number of bits in the array. Following this calculation, the number of possible ARGB obtained in every fabrication increases exponentially with an increasing amount of bits. For example, in a square ARGB of 100×100, the number of possible combinations is $2^{1000}$. Therefore, the probability to replicating one ARGB with the fabrication process is very low.

The security system includes a processor communicatively coupled to a memory, and a protection module communicatively coupled to both the memory and the processor. An ARGB is stored as a passcode. The security system detects entry attempts. It grants access based on a correct match. If an unauthorized passcode is presented access to the restricted area is prevented.

Figure 5:
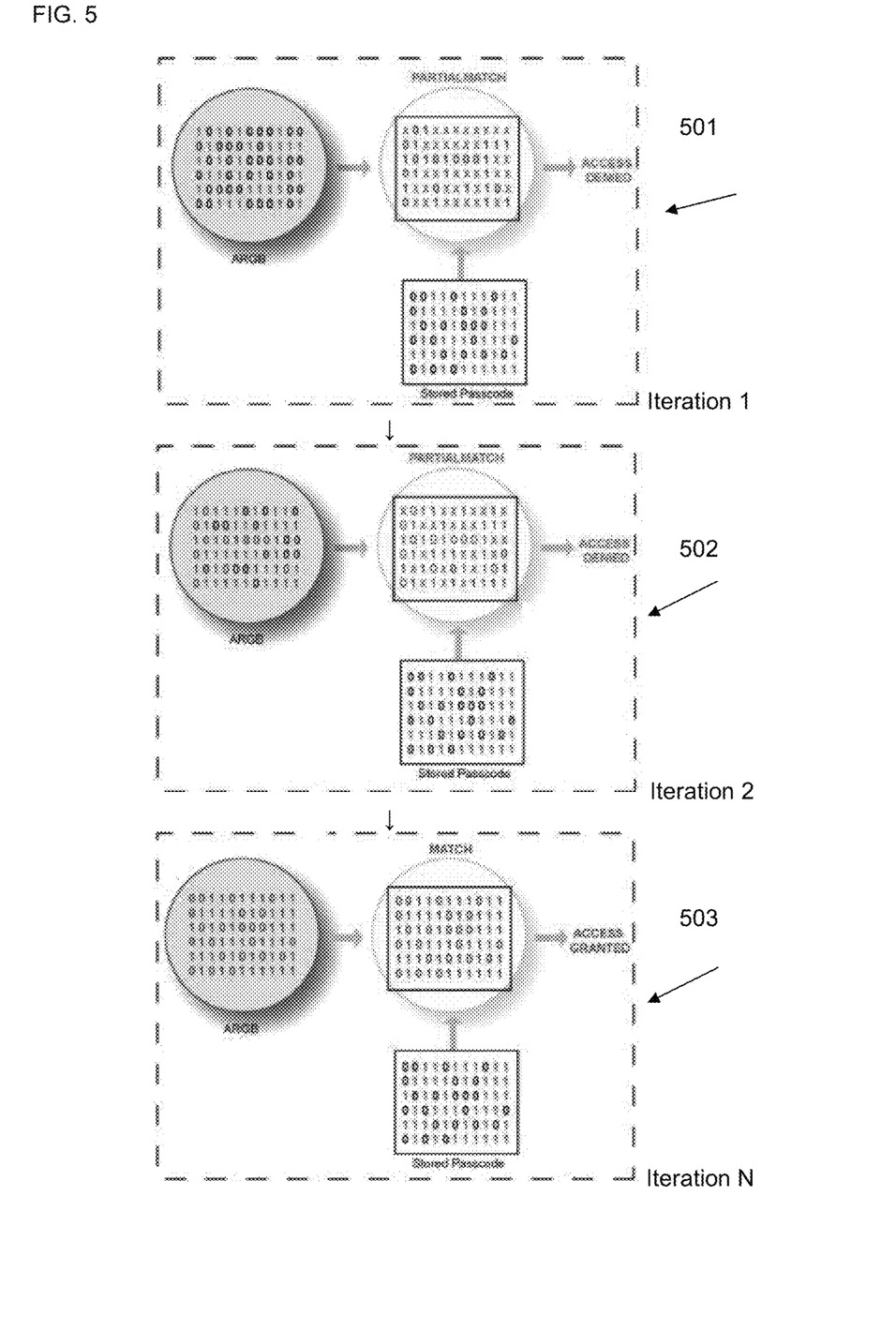
FIG. 5 illustrates iterative unauthorized accessing of a security system based on an array of randomly generated bits physical keys.

FIG. 5 illustrates iterative unauthorized accessing of a security system based on ARGB physical keys. In iterative unauthorized accessing, a system indicates which bits of a different ARGB match the security stored passcode. While access is denied by the system, the matched bits are stored 501. On a second attempt 502 to access the restricted area, a new ARGB is used. The stored bits or matches are reused and new bits which match are stored in the system. After several iterations the passcode is obtained and access is granted to the system 503. In the present invention, an iterative unauthorized accessing security concern is averted by decreasing the number of possible attempts permitted to access the restricted area. For example, after three wrong attempts to access the restricted area a response is triggered, signaling an unauthorized interaction and preventing access.

In the present invention a response to an unauthorized interaction can take many forms. In one embodiment of the present invention, the information in the system containing the valid passcode can be deleted. Deletion prevents any access to the system. In a second embodiment of the present invention, the access mechanism can self-destroy. Self-destruction renders the ARGB inoperative and results in terminating access to the restricted area. Additionally, upon an unauthorized interaction, the passcode can automatically be changed to a different sequence corresponding to a secondary, more complex ARGB. In another embodiment, the security system can delete the array being used to provide the unauthorized passcode.

A three-dimensional ARGB can be created according to the present invention. By reapplying the dispersion to the substrate a second layer can be formed on the substrate, producing a separate second ARGB. Multiple layers can be formed by reapplying the dispersion. Furthermore, the ARGB produced can also be utilized to generate more complex signals.

In an embodiment of the present invention electrical reading of a combination of devices can be employed. A secondary signal can be produced by the amount of current generated by combinations of bits in the array. For example, additional signals can be obtained from the combined value of the current from a limited number of bits in the array. A secondary signal can be produced for all the transistors in a row, column, or diagonal in the array.

In an embodiment of the present invention, population distributions for the value of device parameters originated by carbon nanomaterial variability can be used as a secondary signal. The given populations of semiconducting carbon nanomaterials are not completely homogeneous in their electrical properties causing certain variation in some device parameters. For example, the exact value of on-current (I-on) of transistors fabrication from carbon nanomaterials, or the threshold distribution of the different transistors will vary between each transistor.

In the present invention, each transistor will be unique. The distribution for on-current (I-on) or threshold distribution is very hard to duplicate for any non-carbon nanomaterial technology for such a dense and randomly distributed population of devices.

In an embodiment of the present invention, bit distribution can be utilized as the primary signal combined with another secondary feature of the device which is unique to each array. This adds complexity to the signal. For example, a secondary signal can include the electrical reading of a combination of devices, or the population distributions for the value of device parameters.

The present invention yields a different, random array each time it is carried out since deposition of carbon nanomaterials on an individual trench or rig is random. As a result, physical duplication of a given array is nearly impossible since such a degree of control over deposition of carbon nanomaterials on such a large scale is not available.

Furthermore, the present invention is nearly impossible to duplicate with materials other than CNTFET because the populations of carbon nanomaterials are intrinsically non-homogeneous. Each individual CNTFET has a characteristic I-on and threshold value which can be stored as digital signatures and are hard to duplicate with other technologies.

Another hurdle is that array duplication using other transistor technologies require higher voltages to operate when compared to CNTFET. CNTFET-based arrays can be read using a few millivolts, whereas other technologies cannot operate at this low level.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating an array of random bits, the method comprising:
    modifying a substrate to form a modified surface having a pattern selected from a group consisting of: trenches, rigs, and a combination thereof;
    depositing a compound on the trenches and/or the rigs; and
    applying a dispersion of carbon nanomaterials onto the modified surface to form an array of random bits.

2. The method according to claim 1, wherein the trenches and the rigs are separated by a separation pitch and have a geometric shape and a size such that a carbon nanomaterial can be placed in the trenches and/or the rigs.

3. The method according to claim 1, wherein the compound is an electrically charged monolayer.

4. The method according to claim 1, wherein the dispersion of carbon nanomaterials is prepared by a method comprising:
    dissolving a dispersant in a solvent to form a dispersion;
    adding a plurality of carbon nanomaterials to the dispersion; and
    removing excess dispersant from the dispersion to produce a dispersion of carbon nanomaterials.

5. The method according to claim 4, wherein the dispersant is a conjugated polymer capable of interacting with the plurality of carbon nanomaterials.

6. The method according to claim 5, wherein the conjugated polymer dispersant is a polythiophene having negative charges.

7. The method according to claim 4, wherein the dispersant is an organic molecule capable of interacting with the plurality of carbon nanomaterials.

8. The method of claim 4, wherein the dispersion of carbon nanomaterials is electrically charged so that attracted to the compound.

9. The method according to claim 4, wherein the excess dispersant is removed from the dispersion by a method comprising:
    filtering out the carbon nanomaterials from the dispersion;
    washing with excess solvent; and
    dispersing the plurality of carbon nanomaterials by sonication back into the dispersion.

10. The method according to claim 1, wherein the dispersion of carbon nanomaterials is applied to the modified surface by a technique selected from a group consisting of: drop casting, spin coating, spraying, and dip-coating.

11. The method according to claim 1, further comprising: applying a second layer of the dispersion of carbon nanomaterials onto the modified surface to form a three-dimensional array of random bits.

12. A security system for digital signature including an array of random bits based on carbon nanomaterials, the security system comprising:
    a memory;
    a processor communicatively coupled to the memory; and
    a digital signature module communicatively coupled to the memory and the processor, wherein the processor is configured to perform the steps of a method comprising:
    providing an array of random bits based on carbon nanomaterials;
    depositing at least two metal electrodes into contact with the array of random bits based on carbon nanomaterials;
    measuring electric charge flow through each individual bit in the array of random bits based on carbon nanomaterials;
    mapping a distribution of conductivity based on electric charge flow; and
    forming a digital signature based on the distribution map of conductivity based on electric charge flow.

13. The security system according to claim 12, wherein electric charge flow is measured by applying a voltage to each individual bit in the array of random bits based on carbon nanomaterials.

14. The security system according to claim 12, wherein the steps of measuring electric charge flow and mapping the distribution of conductivity is performed remotely.

15. The security system according to claim 12, further comprising storing the digital signature as a physical key to grant access to a restricted area.

16. The security system according to claim 12, wherein the digital signature is obtained by measuring a Raman signature or a fluorescence signature and/or recording the route that the digital signal travels.

17. The security system according to claim 12, wherein forming the digital signature comprises: mapping electric charge flow from a limited number of bits in the array of random bits based on carbon nanomaterials.

18. The security system according to claim 12, wherein forming the digital signature comprises: mapping the exact on-current value and/or mapping the threshold distribution of the array of random bits based on carbon nanomaterials.

19. A security system for protecting an array of random bits, the security system comprising:
    a memory;
    a processor communicatively coupled to the memory; and
    a protection module communicatively coupled to the memory and the processor, wherein the protection module is configured to carry out the steps of a method comprising:
    installing an array of random bits as a passcode;
    detecting an unauthorized passcode if an unauthorized passcode is presented;
    and preventing access in response to an unauthorized passcode.

20. The security system according to claim 19, wherein the step of preventing access is selected from a group consisting of: deleting the passcode, terminating access, changing the passcode, and deleting the array being used to provide the unauthorized passcode.

* * * * *